(No Model.)
A. K. BATES.
DRINKING FOUNTAIN FOR POULTRY.
No. 328,749. Patented Oct. 20, 1885.
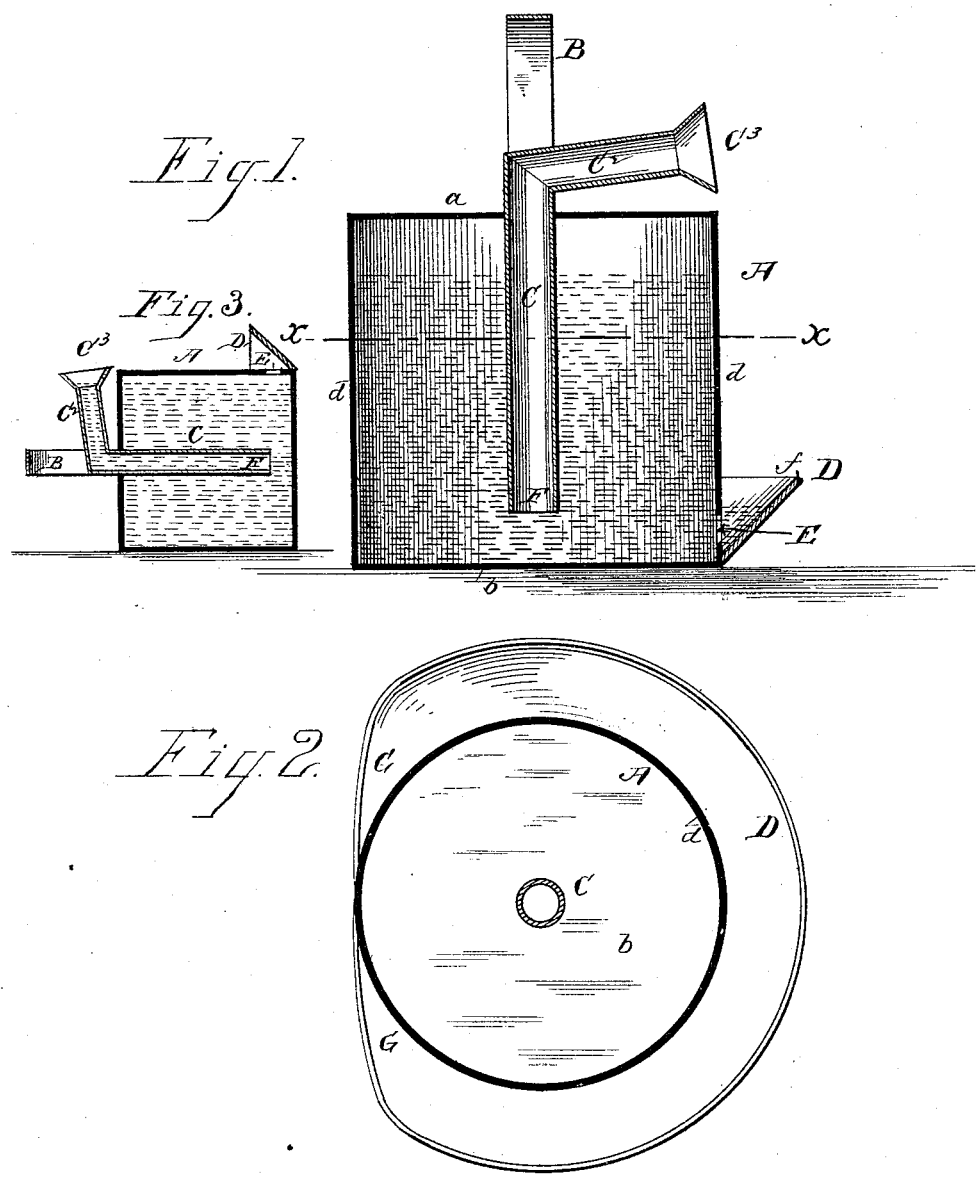
Witnesses,
Wm. S. Bellows
N. E. Bellows.
Inventor,
Alexander K. Bates
By Brown Bros.
Attorneys

UNITED STATES PATENT OFFICE.

ALEXANDER K. BATES, OF WEYMOUTH, MASSACHUSETTS.

DRINKING-FOUNTAIN FOR POULTRY.

SPECIFICATION forming part of Letters Patent No. 328,749, dated October 20, 1885.

Application filed May 16, 1885. Serial No. 165,781. (No model.)

*To all whom it may concern:*

Be it known that I, ALEXANDER K. BATES, of Weymouth, in the county of Norfolk and State of Massachusetts, have invented certain new and useful Improvements in Drinking-Fountains for Poultry, &c., of which the following is a full, clear, and exact description.

This improved drinking-fountain is more especially designed for poultry, but can be used for birds and animals of all kinds; and it consists of a closed receptacle, suitable to contain water or other drinkable liquid or liquids, and provided with a horizontal drinking-trough on its outside, having communication with the inside of the receptacle, and also with a filling-tube, which leads into the receptacle and is open to the outside and inside thereof, and communicates with the receptacle at a height not exceeding and preferably below the height which the upper edge of the drinking-trough is above the bottom of the receptacle, all substantially as hereinafter described, and whereby the receptacle can be charged with liquids through the filling-tube, and after being so charged secure an automatic filling of the trough to the desired level, and then a discharge or feed of the liquid from the receptacle into the trough and preservation of its said level as the liquid in said trough is drank up from time to time, and without otherwise, except through said filling-tube, directly exposing the liquid with which the receptacle has been charged to the outside air.

In the accompanying drawings, Figure 1 is a central vertical section of my improved drinking-fountain, and Fig. 2 is a horizontal section in line $xx$, Fig. 1. Fig. 3 is a similar section to Fig. 1, but with the tank or liquid-receptacle upset or placed in a position to be filled.

In the drawings, A represents a receptacle or tank suitable to hold water. This receptacle A is made of a cylindrical shape, and is closed on its top $a$, bottom $b$, and upright sides, $d$, and is made of sheet metal or other suitable material.

B is a bail handle suitably attached to the tank A for convenience in handling it.

C is a vertical tube, which passes through the center of the top of the tank A, and into the tank, terminates with its open end F near the bottom $b$ of the tank. The tube C projects above the top of the tank, and is there continued in a horizontal extension $C^2$, which slightly inclines to the vertical direction of the tube, and terminates in an open funnel-shaped mouth $C^3$, having its open end situated on a line or plane coincident with the vertical side of the tank.

D is a trough at the lower portion of the tank and nearly surrounding its sides. This trough is formed of an upward-flaring strip of metal attached to the tank at and along the bottom edge thereof, and it is in communication with the inside of the tank through an opening, E, in the side thereof, which opening is below the upper edge, $f$, of the trough, and said upper edge is above the plane of the inner end, F, of the filling-tube opening to the inside of the tank.

G G are the ends of the trough. These ends G are in line with each other and on the side of the tank opposite to the open end $C^3$ of the filling-tube and the aperture E, making communications between the trough and the tank, and they furnish, as it were, a square or broad seat for the rest of the tank, when upset and placed in position, Fig. 3, for being filled.

The tank in position, Fig. 3, to be filled is filled by pouring the liquid into the open funnel-mouth of the filling-tube, then properly presented therefor. The air, as the liquid enters the tank, passes out of the tank at the trough-aperture E.

When the tank is filled, which will be indicated by the presence of the liquid at the funnel-mouth of the filling-tube, the tank is then turned over and placed upon its bottom, Fig. 1, and as it is so turned the liquid from the tank passes therefrom through the aperture E into the trough D, and at the same time from the filling-tube into the tank, and finally the contents of the filling-tube are all emptied into the tank, and the contents of the tank in turn in part emptied into the trough to a height equal to that of the open end of the filling-tube inside of the tank; and this height of liquid in the trough is constantly maintained as from time to time the liquid is drank up, until the level of the liquid in the tank passes below the inner open end of the filling-tube, when practically the tank is empty and should be refilled.

In the operation of the fountain herein described the filling-tube at all times contains no liquid except when the tank is being filled through it and by the atmospheric pressure within it upon the liquid of the tank. The liquid of the tank is caused to pass into the trough without the admission of air to the tank at the feeding-aperture E of said trough, and which for said purpose it is preferable to have below the height or level of the inner open end F of the filling-tube.

The continuation $C^2$ of the filling-tube when the tank is upset to be filled is vertical, and it makes a convenient spout for entering the liquid into the tube proper, and thence into the tank. Again, it serves as a tell-tale when the tank is filled, and its inclination not only keeps the liquid from running out of its funnel-shaped mouth, but directs it to the inside of the tank as the tank is turned back to a rest upon its bottom and placed in position for use.

I am aware that a watering-trough has been constructed of a rectangular trough having a ceries of buckets arranged on the outside thereof, and which communicate by feed-ports with said trough, the latter being provided at one end with a water-supply pipe and closed by a hinged lid. Such construction is not my invention, and is not claimed by me.

Having thus described my invention, what I claim and desire to secure by Letters Patent, is—

A closed tank or fountain, A, having an outside drinking-trough, D, at the base thereof and communicating with said trough by an opening, E, and a filling-tube, C, entering the tank at its top and having a funnel at its outer end which is bent at an angle to the main body of said tube, the lower end of the tube being in substantially the same plane as the opening E, substantially as described.

In testimony whereof I have hereunto set my hand in the presence of two subscribing witnesses.

ALEXANDER K. BATES.

Witnesses.
WM. S. BELLOWS,
ALBERT W. BROWN.